United States Patent
Kost et al.

(10) Patent No.: US 9,263,964 B1
(45) Date of Patent: Feb. 16, 2016

(54) SYSTEMS AND METHODS FOR LOW-POWER LAMP COMPATIBILITY WITH AN ELECTRONIC TRANSFORMER

(71) Applicant: Cirrus Logic, Inc., Austin, TX (US)

(72) Inventors: Michael A. Kost, Austin, TX (US); Wesley L. Mokry, Austin, TX (US); Prashanth Drakshapalli, Austin, TX (US); Stephen T. Hodapp, Austin, TX (US); Firas Azrai, Austin, TX (US)

(73) Assignee: Philips International, B.V., Eindhoven (NL)

( * ) Notice: Subject to any disclaimer, the term of this patent is extended or adjusted under 35 U.S.C. 154(b) by 271 days.

(21) Appl. No.: 13/972,102

(22) Filed: Aug. 21, 2013

Related U.S. Application Data

(60) Provisional application No. 61/782,305, filed on Mar. 14, 2013.

(51) Int. Cl.
*H05B 37/00* (2006.01)
*H02M 7/06* (2006.01)
*H05B 33/08* (2006.01)

(52) U.S. Cl.
CPC .............. *H02M 7/06* (2013.01); *H05B 33/0809* (2013.01)

(58) Field of Classification Search
CPC ........... H05B 33/0845; H05B 33/0887; H05B 33/0818; H02M 3/33507; H02M 5/458
USPC ......... 315/207, 291, 127, 279, 307, 308, 247; 363/16, 37
See application file for complete search history.

(56) References Cited

U.S. PATENT DOCUMENTS

| | | | |
|---|---|---|---|
| 3,806,829 | A | 4/1974 | Duston et al. |
| 4,008,414 | A | 2/1977 | Agnew |
| 4,562,382 | A | 12/1985 | Elliott |
| 5,040,236 | A | 8/1991 | Costello |
| 5,089,753 | A | 2/1992 | Mattas |
| 5,416,387 | A | 5/1995 | Cuk et al. |

(Continued)

FOREIGN PATENT DOCUMENTS

| | | |
|---|---|---|
| EP | 2403120 A2 | 1/2012 |
| EP | 2590477 A1 | 5/2013 |

(Continued)

OTHER PUBLICATIONS

International Search Report and Written Opinion, International Patent Application No. PCT/US2013/071690, mailed Jun. 4, 2014, 13 pages.

(Continued)

*Primary Examiner* — Lincoln Donovan
*Assistant Examiner* — Thomas Skibinski
(74) *Attorney, Agent, or Firm* — Jackson Walker L.L.P.

(57) ABSTRACT

In accordance with systems and methods of the present disclosure, an apparatus for providing compatibility between a load having a reactive impedance and a secondary winding of an electronic transformer may include a power converter and a circuit. The power converter may be configured to transfer electrical energy from the secondary winding to the load. The circuit may be configured to charge an energy storage device coupled to the power converter following start-up of the electronic transformer in order to increase a voltage of the energy storage device to at least a voltage level sufficient for the electronic transformer to enter steady-state operation.

16 Claims, 6 Drawing Sheets

(56) References Cited

U.S. PATENT DOCUMENTS

| | | | |
|---|---|---|---|
| 5,583,402 A | 12/1996 | Moisin et al. | |
| 5,650,694 A | 7/1997 | Jayaraman et al. | |
| 5,872,429 A | 2/1999 | Xia et al. | |
| 6,369,461 B1* | 4/2002 | Jungreis et al. | 307/46 |
| 6,407,935 B1 | 6/2002 | Chang et al. | |
| 7,812,550 B2 | 10/2010 | Harmgardt et al. | |
| 8,067,902 B2 | 11/2011 | Newman, Jr. et al. | |
| 8,212,491 B2 | 7/2012 | Kost et al. | |
| 8,547,034 B2 | 10/2013 | Melanson et al. | |
| 8,653,759 B2 | 2/2014 | Vigh et al. | |
| 8,664,883 B2 | 3/2014 | Hiramatu et al. | |
| 8,698,483 B2 | 4/2014 | Riesebosch | |
| 8,716,957 B2 | 5/2014 | Melanson et al. | |
| 8,723,431 B2 | 5/2014 | Deppe et al. | |
| 8,742,674 B2 | 6/2014 | Shteynberg et al. | |
| 8,928,243 B2 | 1/2015 | Potter et al. | |
| 8,933,648 B1 | 1/2015 | Putman et al. | |
| 9,072,125 B2 | 6/2015 | King et al. | |
| 9,167,664 B2 | 10/2015 | Xie et al. | |
| 9,215,765 B1 | 12/2015 | Mokry et al. | |
| 9,215,770 B2 | 12/2015 | Mazumdar et al. | |
| 2003/0127994 A1 | 7/2003 | Patchornik et al. | |
| 2003/0151931 A1 | 8/2003 | Kohno | |
| 2005/0174162 A1* | 8/2005 | Cheng et al. | 327/535 |
| 2005/0249667 A1 | 11/2005 | Tuszynski et al. | |
| 2006/0147371 A1 | 7/2006 | Tuszynski et al. | |
| 2007/0040516 A1 | 2/2007 | Chen | |
| 2007/0076459 A1 | 4/2007 | Limpkin | |
| 2007/0262654 A1 | 11/2007 | Mosebrook et al. | |
| 2007/0285028 A1 | 12/2007 | Tsinker et al. | |
| 2008/0013343 A1 | 1/2008 | Matthews | |
| 2008/0018261 A1 | 1/2008 | Kastner | |
| 2008/0024074 A1 | 1/2008 | Mosebrook et al. | |
| 2008/0119421 A1 | 5/2008 | Tuszynski et al. | |
| 2008/0224636 A1 | 9/2008 | Melanson | |
| 2009/0184662 A1 | 7/2009 | Given et al. | |
| 2009/0295292 A1 | 12/2009 | Harmgardt et al. | |
| 2010/0013409 A1 | 1/2010 | Quek et al. | |
| 2010/0141178 A1 | 6/2010 | Negrete et al. | |
| 2010/0164406 A1 | 7/2010 | Kost et al. | |
| 2010/0225251 A1 | 9/2010 | Maruyama | |
| 2010/0244726 A1 | 9/2010 | Melanson | |
| 2011/0012530 A1 | 1/2011 | Zheng et al. | |
| 2011/0115400 A1 | 5/2011 | Harrison et al. | |
| 2011/0121751 A1 | 5/2011 | Harrison et al. | |
| 2011/0121752 A1 | 5/2011 | Newman, Jr. et al. | |
| 2011/0121754 A1 | 5/2011 | Shteynberg et al. | |
| 2011/0127925 A1 | 6/2011 | Huang et al. | |
| 2011/0199017 A1 | 8/2011 | Dilger | |
| 2011/0210674 A1 | 9/2011 | Melanson | |
| 2011/0266968 A1 | 11/2011 | Bordin et al. | |
| 2011/0309759 A1 | 12/2011 | Shteynberg et al. | |
| 2012/0025729 A1 | 2/2012 | Melanson et al. | |
| 2012/0043913 A1 | 2/2012 | Melanson | |
| 2012/0049752 A1 | 3/2012 | King et al. | |
| 2012/0098454 A1 | 4/2012 | Grotkowski et al. | |
| 2012/0106216 A1 | 5/2012 | Tzinker et al. | |
| 2012/0112638 A1 | 5/2012 | Melanson et al. | |
| 2012/0112648 A1 | 5/2012 | Hariharan | |
| 2012/0119669 A1 | 5/2012 | Melanson et al. | |
| 2012/0139431 A1 | 6/2012 | Thompson | |
| 2012/0146546 A1 | 6/2012 | Hu et al. | |
| 2012/0169240 A1 | 7/2012 | Macfarlane | |
| 2012/0229041 A1 | 9/2012 | Saes et al. | |
| 2012/0230073 A1 | 9/2012 | Newman et al. | |
| 2012/0242238 A1 | 9/2012 | Chen et al. | |
| 2012/0286684 A1 | 11/2012 | Melanson et al. | |
| 2012/0286696 A1 | 11/2012 | Ghanem | |
| 2012/0286826 A1 | 11/2012 | King et al. | |
| 2012/0299501 A1 | 11/2012 | Kost et al. | |
| 2013/0002163 A1 | 1/2013 | He et al. | |
| 2013/0113458 A1 | 5/2013 | Riesebosch | |
| 2013/0278159 A1 | 10/2013 | Del Carmen, Jr. et al. | |
| 2014/0009078 A1 | 1/2014 | Xie et al. | |
| 2014/0009079 A1 | 1/2014 | Xie et al. | |
| 2014/0009082 A1 | 1/2014 | King et al. | |
| 2014/0028214 A1 | 1/2014 | Mazumdar et al. | |
| 2014/0167639 A1 | 6/2014 | King et al. | |
| 2014/0167652 A1 | 6/2014 | King et al. | |
| 2014/0239832 A1 | 8/2014 | Shteynberg et al. | |
| 2014/0333205 A1 | 11/2014 | Kost et al. | |
| 2015/0061536 A1 | 3/2015 | Xie et al. | |

FOREIGN PATENT DOCUMENTS

| | | | |
|---|---|---|---|
| WO | 2011063205 A1 | 5/2011 | |
| WO | 2011111005 A1 | 9/2011 | |
| WO | 2013072793 A1 | 5/2013 | |
| WO | 2013090904 A1 | 6/2013 | |

OTHER PUBLICATIONS

International Search Report and Written Opinion, International Patent Application No. PCT/US2013/047777, mailed Jun. 26, 2014, 21 pages.

International Search Report and Written Opinion, International Patent Application No. PCT/US2013/047844, mailed Jul. 23, 2014, 14 pages.

International Search Report and Written Opinion, International Patent Application No. PCT/US2014/032182, mailed Jul. 24, 2014, 10 pages.

International Search Report and Written Opinion, International Patent Application No. PCT/US2014/037864, mailed Sep. 29, 2014, 8 pages.

International Search Report and Written Opinion, International Patent Application No. PCT/US2015/035052, mailed Oct. 21, 2015, 11 pages.

\* cited by examiner

SYSTEMS AND METHODS FOR LOW-POWER LAMP COMPATIBILITY WITH AN ELECTRONIC TRANSFORMER

RELATED APPLICATIONS

The present disclosure claims priority to U.S. Provisional Patent Application Ser. No. 61/782,305, filed Mar. 14, 2013, which is incorporated by reference herein in its entirety.

FIELD OF DISCLOSURE

The present disclosure relates in general to the field of electronics, and more specifically to systems and methods for ensuring compatibility between one or more low-power lamps and the power infrastructure to which they are coupled.

BACKGROUND

Customers of lighting are increasingly choosing low-power lighting to meet their lighting needs. Typically, such low-power lighting employs halogen light bulbs, light-emitting diode light bulbs, compact fluorescent light bulbs, or other types of light bulbs or lamp assemblies that produce light with intensity on par with that of traditional incandescent light bulbs, but with significantly less power consumption. However, many of such light bulbs or lamp assemblies operate using a voltage (e.g., 12 volts) much less than that typically provided by traditional power infrastructures. For example, in the United States, public utilities generally provide electricity in the form of a 60-Hertz sinusoid with a magnitude of 120 volts. Thus, for low-power lamp assemblies to properly operate in the existing power infrastructure, a voltage transformer must be interposed between the public electricity source and the lamp assembly.

Transformers present in a power infrastructure may include magnetic or electronic transformers. A magnetic transformer typically comprises two coils of conductive material (e.g., copper) each wrapped around a core of material having a high magnetic permeability (e.g., iron) such that magnetic flux passes through both coils. In operation, an electric current in the first coil may produce a changing magnetic field in the core, such that the changing magnetic field induces a voltage across the ends of the secondary winding via electromagnetic induction. Thus, a magnetic transformer may step voltage levels up or down while providing electrical isolation in a circuit between components coupled to the primary winding and components coupled to the secondary winding.

On the other hand, an electronic transformer is a device which behaves in the same manner as a conventional magnetic transformer in that it steps voltage levels up or down while providing isolation and can accommodate load current of any power factor. An electronic transformer generally includes power switches which convert a low-frequency (e.g., direct current to 400 Hertz) voltage wave to a high-frequency voltage wave (e.g., in the order of 10,000 Hertz). A comparatively small magnetic transformer may be coupled to such power switches and thus provides the voltage level transformation and isolation functions of the conventional magnetic transformer.

FIG. 1 depicts a lighting system 101 that includes an electronic transformer 122 and a lamp assembly 142. Such a system may be used, for example, to transform a high voltage (e.g., 110V, 220 V) to a low voltage (e.g., 12 V) for use with a halogen lamp (e.g., an MR16 halogen lamp). In some instances, such a transformer 122 may be present in a lighting fixture configured to receive a lamp assembly 142, wherein such lamp assembly 142 includes a source of light (e.g., LEDs 152) for providing illumination. Generally, a transformer 122 designed to receive an incandescent or halogen lamp assembly "expects" a linear load (e.g., one which has a primarily constant impedance, in which current varies in a linear fashion with the voltage applied to the load). However, when a lamp that has a non-linear operating mode (e.g., including but not limited to a light-emitting diode, or LED, lamp) is used with an electronic transformer designed to receive a linear load, the electronic transformer may not function properly, due to the fact that the non-linear load may present widely varying impedances for different time durations.

Furthermore, an electronic transformer 122 may have a power rating range, such as from a minimum power rating to a maximum power rating (e.g., zero watts to 60 watts). When a non-linear load is coupled to electronic transformer 122, the varying non-linear impedance may consume power that falls outside the power rating range.

Referring to FIG. 1, lighting system 101 may receive an AC supply voltage $V_{SUPPLY}$ from voltage supply 104. The supply voltage $V_{SUPPLY}$ is, for example, a nominally 60 Hz/110 V line voltage in the United States of America or a nominally 50 Hz/220 V line voltage in Europe. Electronic transformer 122 may receive the AC supply voltage $V_{SUPPLY}$ at its input where it is rectified by a full-bridge rectifier formed by diodes 124. As voltage $V_{SUPPLY}$ increases in magnitude, voltage on capacitor 126 may increase to a point where diac 128 will turn on (the diac break-over voltage), thus also turning on transistor 129. Once transistor 129 is on, capacitor 126 may be discharged and oscillation will start due to the self-resonance of switching transformer 130, which includes a primary winding ($T_{2a}$) and two secondary windings ($T_{2b}$ and $T_{2c}$). Switching transformer 130 may be a saturable core transformer, and if the impedance of lamp assembly 142 is too low, the core of switching transformer 130 may saturate causing the voltage across the base-emitter junction of transistor 129 to go to zero, thus turning off transistor 129. Thus, the load presented to transformer 122 by lamp 142 must be low enough that the current through switching transformer 130 at the break-over voltage of diac 128 will saturate switching transformer 130, causing it to oscillate.

Lamp assembly 142 may receive the AC supply voltage $V_S$ at its input where it is rectified by a full-bridge rectifier formed by diodes 144. Such voltage may charge a capacitor 146, thus providing a direct current voltage $V_{DD}$ for power converter 148. Power converter 148 may be operable to provide a regulated voltage $V_{LINK}$ to LED driver 150, which itself may include circuitry for driving an output voltage or current to LEDs 152, thus generating photonic energy. During start-up of electronic transformer 122, capacitor 146 needs to charge to a voltage $V_{DD}$ sufficient to allow power converter 148 and LED driver 150 to begin steady-state operation. Because capacitor 146 is the primary load to electronic transformer 122 while power converter 148 and LED driver 150 start-up, a non-linear load is provided to electronic transformer 122. Upon start-up of electronic transformer 122, capacitor 146 initially provides a low impedance to electronic transformer 122, and electronic transformer 122 may begin oscillating. However, when capacitor 146 reaches a voltage $V_{DD}$ equal to a diode threshold voltage below the peak voltage value from electronic transformer 122, capacitor 146 then presents a high impedance to electronic transformer 122, and electronic transformer 122 may stop oscillation. If the voltage $V_{DD}$ across capacitor 146 is less than the steady-state voltage of power converter 148, then lamp assembly 142 may fail to present a linear load to electronic transformer 122.

SUMMARY

In accordance with the teachings of the present disclosure, certain disadvantages and problems associated with ensuring compatibility of a low-power lamp with a transformer may be reduced or eliminated.

In accordance with embodiments of the present disclosure, an apparatus for providing compatibility between a load having a reactive impedance and a secondary winding of an electronic transformer may include a power converter and a circuit. The power converter may be configured to transfer electrical energy from the secondary winding to the load. The circuit may be configured to charge an energy storage device coupled to the power converter following start-up of the electronic transformer in order to increase a voltage of the energy storage device to at least a voltage level sufficient for the power converter to enter steady-state operation.

In accordance with these and other embodiments of the present disclosure, a method for providing compatibility between a load having a reactive impedance and a secondary winding of an electronic transformer may include charging an energy storage device coupled to a power converter following start-up of the electronic transformer in order to increase a voltage of the energy storage device to at least a voltage level sufficient for the power converter to enter steady-state operation.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
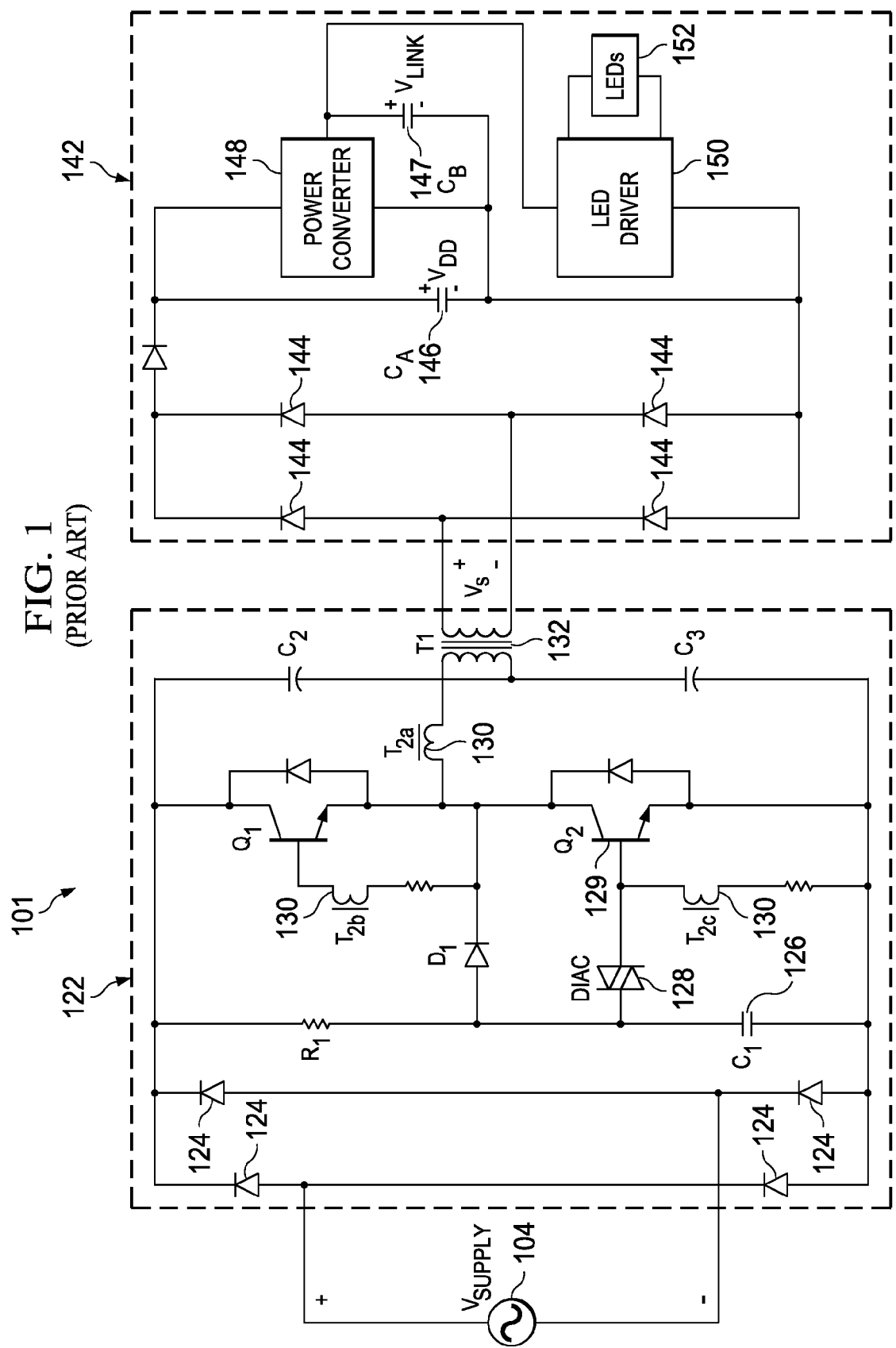
FIG. 1 illustrates a lighting system that includes an electronic transformer, as is known in the art.
Figure 2A:
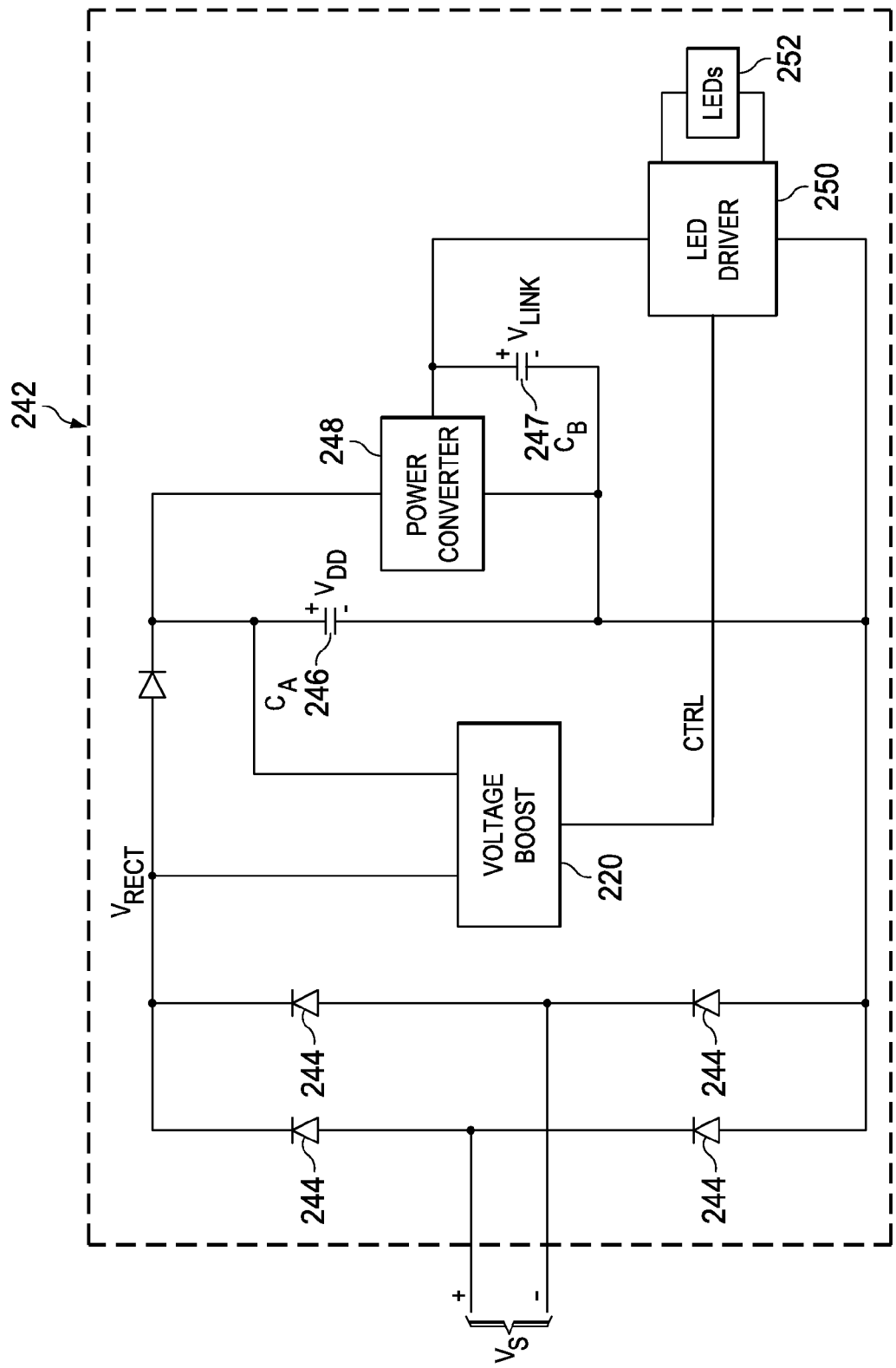
FIGS. 2A and 2B illustrate example lamp assemblies including circuitry for providing compatibility between the lamp assembly and other elements of a lighting system, in accordance with embodiments of the present disclosure.
Figure 2B:
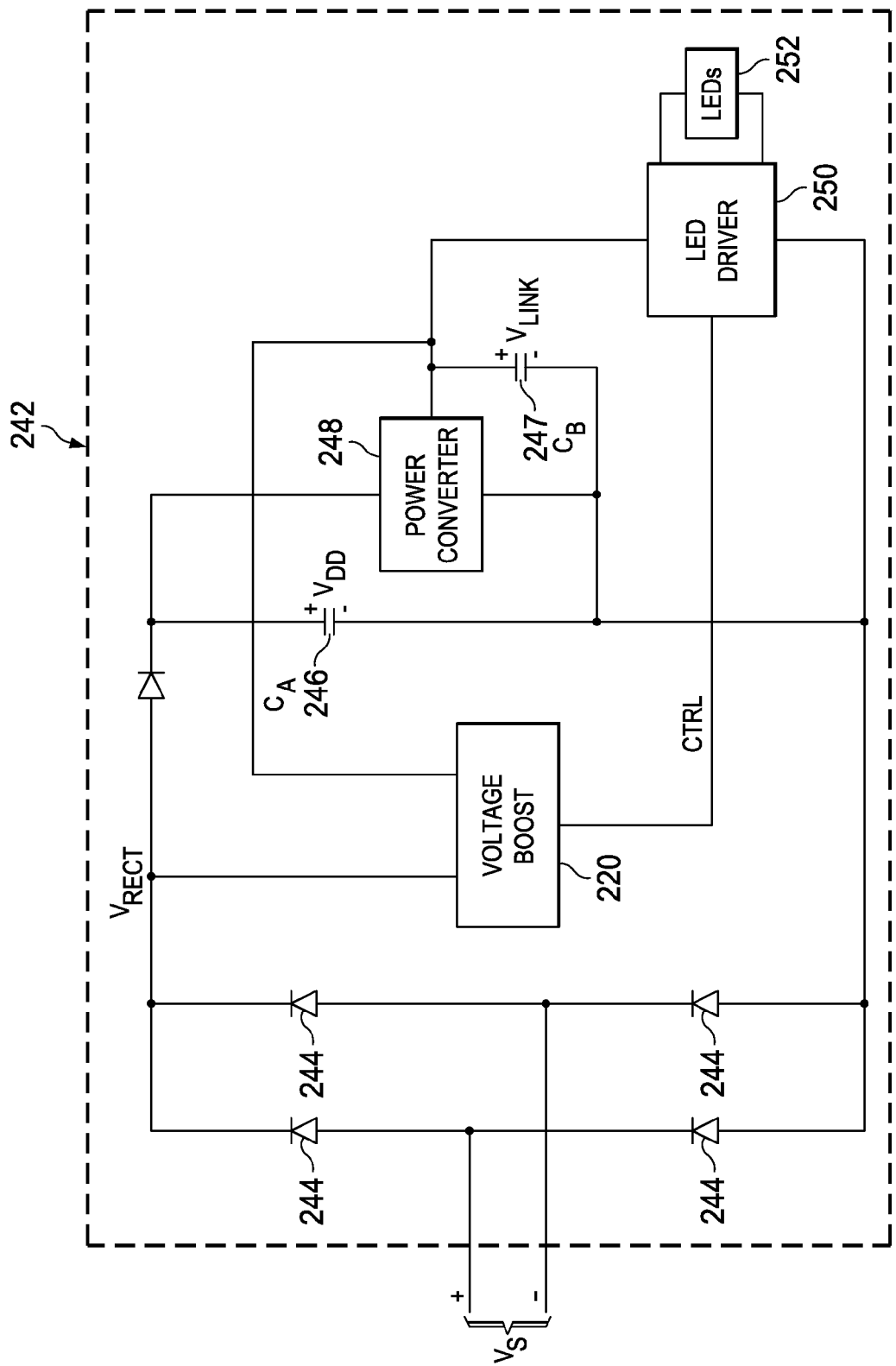

FIGS. 2A and 2B illustrate example lamp assemblies 242 including circuitry for providing compatibility between lamp assembly 242 and other elements of a lighting system (e.g., an electronic transformer), in accordance with embodiments of the present disclosure.

A lamp assembly 242 may include charging capacitor 246 which, during operation of such lamp assembly 242, charges as a result of energy transferred from the input of such lamp assembly 242 to a direct current voltage $V_{DD}$ for powering power converter 248. Power converter 248 may comprise any system, device, or apparatus for providing a regulated, direct current voltage $V_{LINK}$ on capacitor 247 to LED driver 250. For example, in some embodiments, power converter 248 may comprise a boost converter. In turn, LED driver 250 may comprise any system, device, or apparatus for driving an output voltage to light-emitting diodes (LEDs) 252 or another light source. Together, capacitor 246 and power converter 248 may, in the absence of circuitry for providing compatibility between a lamp assembly 242 and other elements of a lighting system (e.g., an electronic transformer), present as a load having a non-linear reactive impedance to components of a lighting system coupled at the input terminals of a lamp assembly 242, which, as described in the "Background" section above, may lead to improper or undesirable operation of lamp assembly 242.

In addition, a lamp assembly 242 as depicted in either of FIG. 2A or 2B may include a voltage boost circuit 220. Voltage boost circuit 220 may be any system, device, or apparatus for charging an energy storage device coupled to power converter 248 (e.g., a capacitor such as capacitor 246 as shown in FIG. 2A or capacitor 247 as shown in FIG. 2B) during a duration of time following start-up of an electronic transformer coupled via its secondary winding to the lamp assembly 242 (e.g., via input terminals of the bridge rectifier formed by diodes 244) in order to increase the voltage (e.g., $V_{DD}$ or $V_{LINK}$) of the energy storage device during the duration of time, such that the voltage of the energy storage device reaches a voltage level sufficient to power the power converter for steady-state operation, after which power converter 248 may begin receiving electrical energy from a secondary of an electronic transformer coupled to power converter 248. Accordingly, responsive to the voltage (e.g., $V_{DD}$ or $V_{LINK}$) of the energy storage device reaching a voltage threshold, voltage boost circuit 220 may cease charging the energy storage device. In some embodiments, a control signal, for example control signal CTRL shown as generated by LED driver 250 in FIGS. 2A and 2B, may indicate that the voltage of the energy storage device has reached the voltage threshold, and thus voltage boost circuit 220 may cease charging the energy storage device in response to such control signal. In these and other embodiments the voltage threshold may be greater than or approximately equal to a voltage for $V_{LINK}$ sufficient for LED driver 250 to drive LEDs 252. In these and other embodiments the voltage threshold may be greater than or approximately equal to a voltage $V_{DD}$ sufficient for power converter 248 to drive an output voltage $V_{LINK}$ sufficient for LED driver 250 to drive LEDs 252. Once voltage boost circuit 220 ceases charging the energy storage device, power converter 248 may then take over driving the load and presenting the load to the electronic transformer. Thus, voltage boost circuit 220 may ensure proper operation of power converter 248 during start-up, and then allow transition to steady-state operation of the power converter 248.

Figure 3:
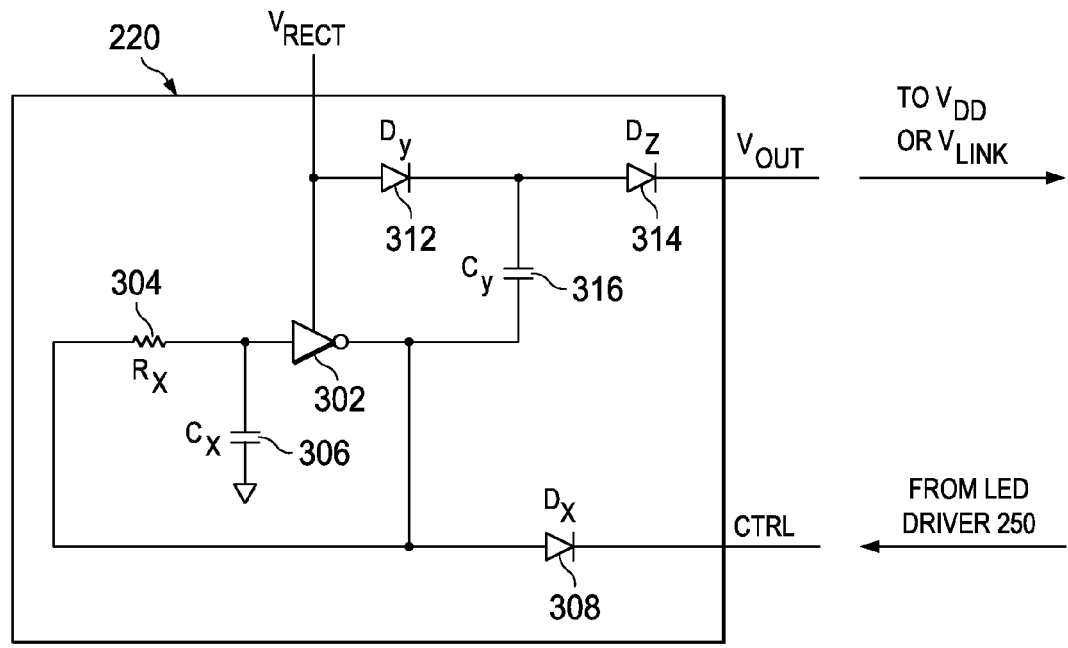
FIG. 3 illustrates an example voltage boost circuit for use in the example lamp assemblies of FIGS. 2A and 2B, in accordance with embodiments of the present disclosure.

FIG. 3 illustrates an example voltage boost circuit 220 for use in the example lamp assemblies of FIGS. 2A and 2B, in accordance with embodiments of the present disclosure. In the embodiments represented by FIG. 3, a ring oscillator formed by inverter 302, resistor 304, and capacitor 306 may drive a voltage doubler formed by diodes 312 and 314 and capacitor 316. The supply voltage for the ring oscillator and voltage doubler may be the rectified secondary winding voltage $V_{RECT}$ as generated by the bridge rectifier formed by diodes 244. The ring oscillator may be selectively enabled by a control signal (e.g., control signal CTRL generated by LED driver 250) such that when the voltage $V_{LINK}$ of the load has reached the voltage threshold, the ring oscillator may be disabled and voltage boost circuit 220 may cease charging the energy storage device in response to such control signal.

Although FIG. 3 depicts a particular type of circuit for voltage boost circuit 220, voltage boost circuit 220 may be implemented in any manner suitable for performing the functionality described herein. For example, in some embodiments, voltage boost circuit 220 may comprise an inductor-based boost circuit.

Figure 4A:
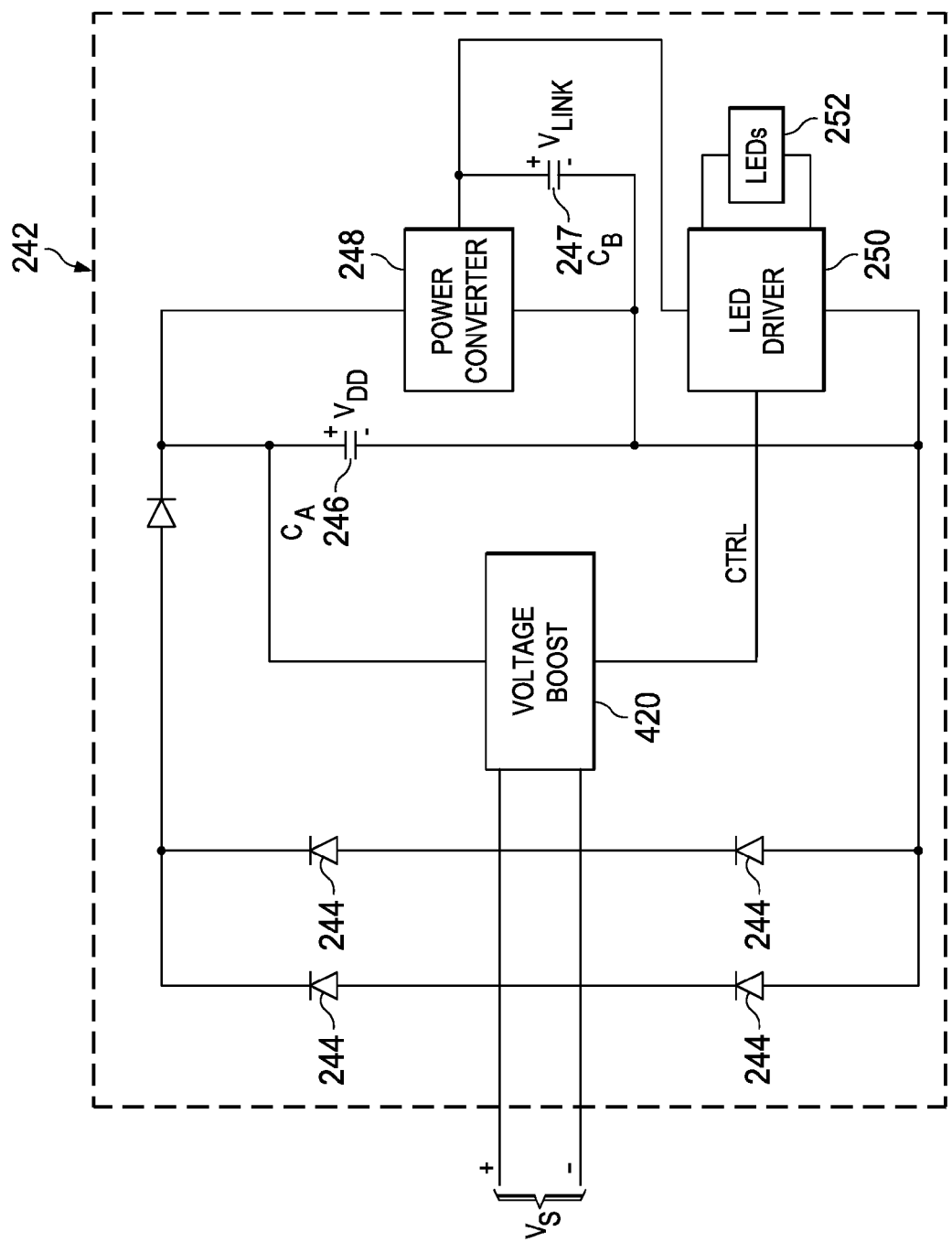
FIGS. 4A and 4B illustrate additional example lamp assemblies including circuitry for providing compatibility between the lamp assembly and other elements of a lighting system, in accordance with embodiments of the present disclosure.
Figure 4B:
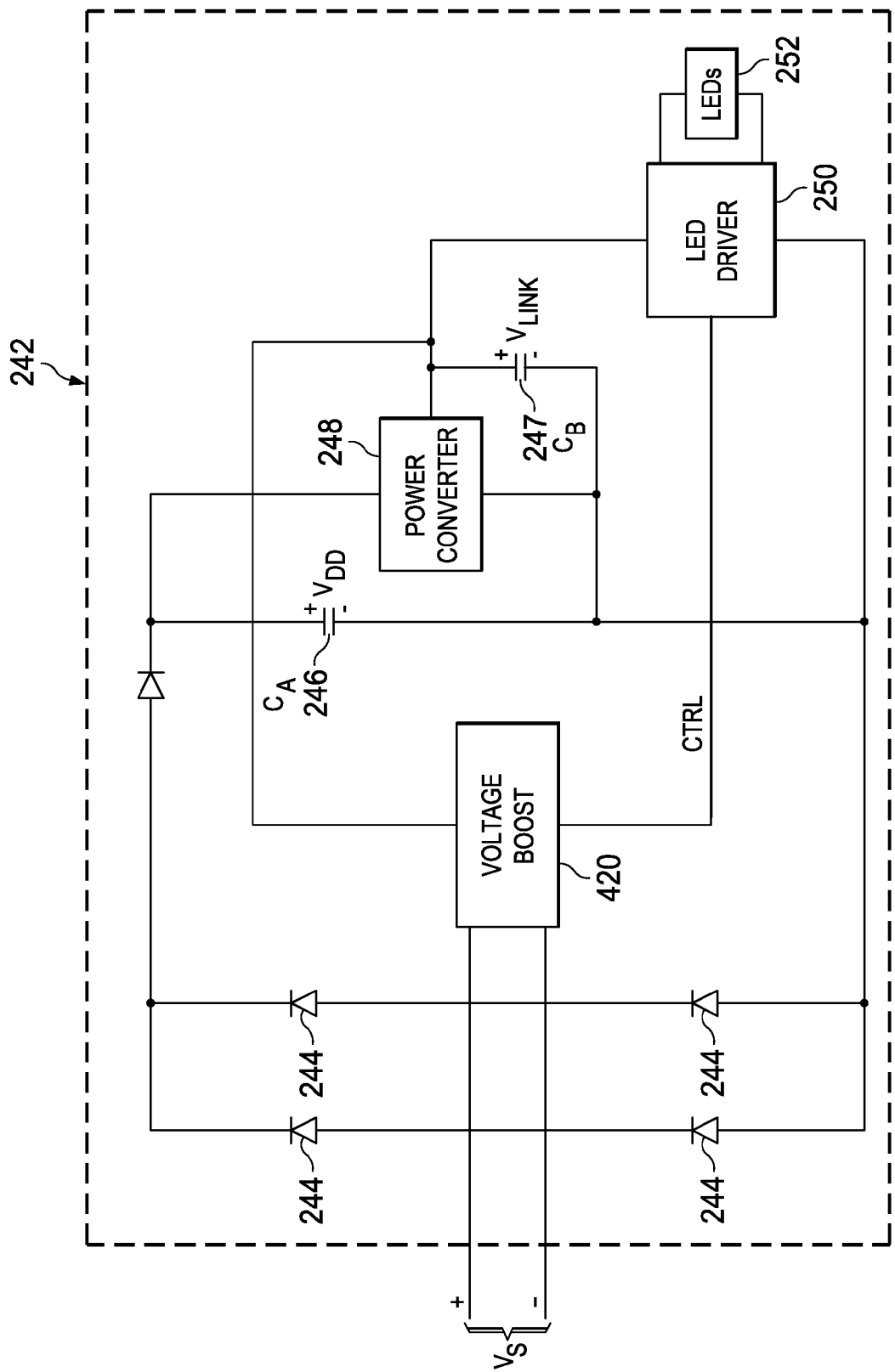

FIGS. 4A and 4B illustrate additional example lamp assemblies 242 including circuitry for providing compatibility between the lamp assembly and other elements of a lighting system, in accordance with embodiments of the present disclosure. The example lamp assemblies 242 disclosed in FIGS. 4A and 4B are similar in structure and functionality to those example lamp assemblies 242 disclosed in FIGS. 2A and 2B, and accordingly, only substantive differences in FIGS. 4A and 4B as compared to FIGS. 2A and 2B are described below. In particular, in FIGS. 4A and 4B, a voltage boost circuit 420 is supplied by the unrectified secondary winding voltage $V_S$, rather than by the rectified secondary winding voltage $V_{RECT}$.

Figure 5:
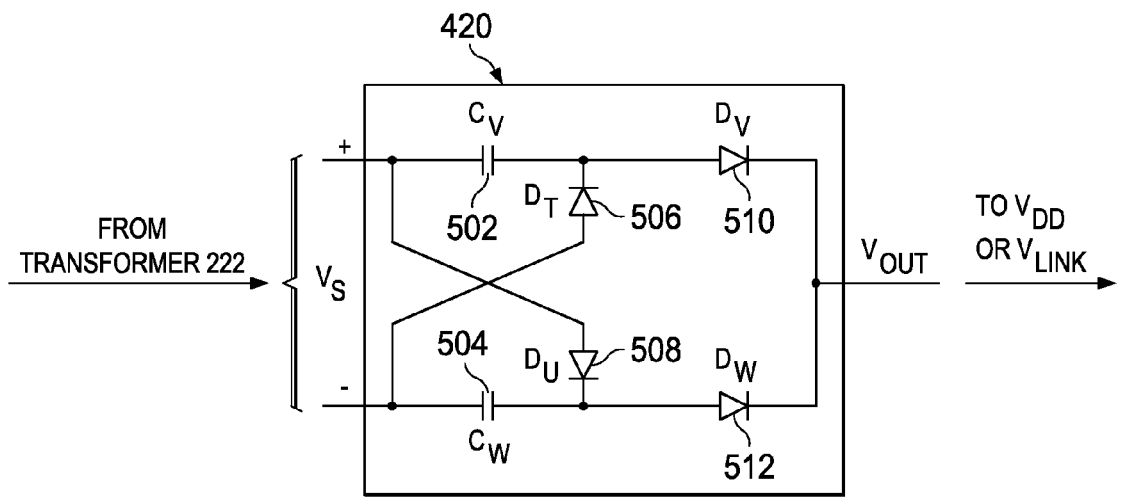
FIG. 5 illustrates an example voltage boost circuit for use in the example lamp assemblies of FIGS. 4A and 4B, in accordance with embodiments of the present disclosure.

FIG. 5 illustrates an example voltage boost circuit 420 for use in the example lamp assemblies of FIGS. 4A and 4B, in accordance with embodiments of the present disclosure. In the embodiments represented by voltage boost circuit 420, the electronic secondary winding voltage $V_S$ may provide oscillation for driving a voltage doubler formed by capacitors 502 and 504, as rectified by diodes 506, 508, 510, and 512. The output voltage VOUT may drive either of voltage VDD or VLINK, in order to provide compatibility between the load of lamp assembly 242 and an electronic transformer by charging an energy storage device coupled to power converter 248 (e.g., a capacitor such as capacitor 246 as shown in FIG. 4A or capacitor 247 as shown in FIG. 4B) during a duration of time following start-up of an electronic transformer coupled via its secondary winding to the lamp assembly 242 (e.g., via input terminals of the bridge rectifier formed by diodes 244) in order to increase a voltage (e.g., $V_{LINK}$) of a load of the lamp assembly (e.g., LED driver 250) during the duration of time, as described in greater detail above.

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An apparatus for providing compatibility between a load having a reactive impedance and a secondary winding of an electronic transformer, comprising:
    a power converter for transferring electrical energy from the secondary winding to the load; and
    a circuit for charging an energy storage device coupled to the power converter following start-up of the electronic transformer in order to increase a voltage of the energy storage device to at least a voltage level sufficient for the power converter to enter steady-state operation, after which the power converter begins receiving electrical energy from the secondary winding of the electronic transformer.

2. The apparatus of claim 1, wherein the circuit is configured to, responsive to the voltage reaching a voltage threshold, cease charging the energy storage device.

3. The apparatus of claim 2, wherein the voltage threshold is greater than or approximately equal to the voltage level sufficient for the power converter to enter steady-state operation.

4. The apparatus of claim 1, wherein the power converter is coupled to the secondary winding via a bridge rectifier.

5. The apparatus of claim 1, wherein the load comprises a driving circuit for driving a light source.

6. The apparatus of claim 5, wherein the light source comprises one or more light-emitting diodes.

7. The apparatus of claim 1, wherein the energy storage device comprises a capacitor.

8. The apparatus of claim 1, wherein the circuit comprises a ring oscillator driving a voltage doubler for charging the energy storage device.

9. A method for providing compatibility between a load having a reactive impedance and a secondary winding of an electronic transformer, comprising charging an energy storage device coupled to a power converter following start-up of the electronic transformer in order to increase a voltage of the energy storage device to at least a voltage level sufficient for the power converter to enter steady-state operation, after which the power converter begins receiving electrical energy from the secondary winding of the electronic transformer.

10. The method of claim 9, further comprising ceasing charging the energy storage device responsive to the voltage reaching a voltage threshold.

11. The method of claim 10, wherein the voltage threshold is greater than or approximately equal to the voltage level sufficient for the power converter to enter steady-state operation.

12. The method of claim 9, wherein the power converter is coupled to the secondary winding via a bridge rectifier.

13. The method of claim 9, wherein the load comprises a driving circuit for driving a light source.

14. The method of claim 13, wherein the light source comprises one or more light-emitting diodes.

15. The method of claim 9, wherein the energy storage device comprises a capacitor.

16. The method of claim 9, further comprising driving with a ring oscillator a voltage doubler for charging the energy storage device.

* * * * *